United States Patent
Stauffer et al.

(10) Patent No.: US 12,096,278 B2
(45) Date of Patent: Sep. 17, 2024

(54) DYNAMIC RESOURCE ALLOCATION ACROSS MULTIPLE NETWORK SERVICE PROVIDERS

(71) Applicant: GOOGLE LLC, Mountain View, CA (US)

(72) Inventors: Erik Stauffer, Mountain View, CA (US); Jibing Wang, San Jose, CA (US)

(73) Assignee: Google LLC, Mountain View, CA (US)

(*) Notice: Subject to any disclaimer, the term of this patent is extended or adjusted under 35 U.S.C. 154(b) by 190 days.

(21) Appl. No.: 17/430,896

(22) PCT Filed: Feb. 13, 2020

(86) PCT No.: PCT/US2020/018068
§ 371 (c)(1),
(2) Date: Aug. 13, 2021

(87) PCT Pub. No.: WO2020/168049
PCT Pub. Date: Aug. 20, 2020

(65) Prior Publication Data
US 2022/0038956 A1   Feb. 3, 2022

Related U.S. Application Data

(60) Provisional application No. 62/805,612, filed on Feb. 14, 2019.

(51) Int. Cl.
*H04W 28/16* (2009.01)
*H04L 43/08* (2022.01)
(Continued)

(52) U.S. Cl.
CPC ............ *H04W 28/16* (2013.01); *H04L 43/08* (2013.01); *H04W 48/10* (2013.01); *H04W 88/06* (2013.01)

(58) Field of Classification Search
None
See application file for complete search history.

(56) References Cited

U.S. PATENT DOCUMENTS 6,816,907 B1   11/2004   Mei et al.
9,844,058 B2 *  12/2017   Xiao ................... H04L 5/0091
(Continued)

FOREIGN PATENT DOCUMENTS

CN   105075308 A   11/2015
CN   105848180 A    8/2016
(Continued)

OTHER PUBLICATIONS

International Search Report and Written Opinion for Application No. PCT/US2020/018068, dated May 29, 2020.
(Continued)

*Primary Examiner* — Noel R Beharry
*Assistant Examiner* — Angelie T Ngo
(74) *Attorney, Agent, or Firm* — Womble Bond Dickinson (US) LLP

(57) ABSTRACT

A technique for utilizing network resources includes allocating a first set of network resources associated with a first network provider that operates a first core network and utilizes a first radio carrier (802) and a second set of network resources associated with a second network provider that operates a second core network and utilizes a second radio carrier (808). The technique also includes combining the first set of network resources and the second set of network resources to generate a combined set of network resources (810), and using the combined set of network resources to transmit data between a user device and the first core network and between the user device and the second core network, concurrently in a same communication session (812).

16 Claims, 11 Drawing Sheets

(51) Int. Cl.
*H04W 48/10* (2009.01)
*H04W 88/06* (2009.01)

(56) References Cited

U.S. PATENT DOCUMENTS

| | | | |
|---|---|---|---|
| 11,234,290 B1* | 1/2022 | Raghunathan | H04W 88/10 |
| 2007/0149187 A1* | 6/2007 | Levy | H04L 5/0007 |
| | | | 455/425 |
| 2009/0043669 A1 | 2/2009 | Hibbets et al. | |
| 2011/0246552 A1 | 10/2011 | Nicholson et al. | |
| 2012/0143864 A1 | 6/2012 | Quigley et al. | |
| 2014/0148165 A1 | 5/2014 | Serravalle et al. | |
| 2014/0228039 A1 | 8/2014 | Zhao et al. | |
| 2015/0119023 A1 | 4/2015 | Wang et al. | |
| 2015/0365829 A1 | 12/2015 | Grayson et al. | |
| 2016/0255531 A1 | 9/2016 | Stein et al. | |
| 2017/0054700 A1 | 2/2017 | Brown et al. | |
| 2017/0127217 A1* | 5/2017 | Miao | H04W 76/15 |
| 2018/0097585 A1 | 4/2018 | Dev et al. | |
| 2018/0160313 A1 | 6/2018 | Montojo et al. | |
| 2018/0288681 A1* | 10/2018 | Paredes Cabrera | H04W 48/06 |
| 2018/0368016 A1* | 12/2018 | Lee | H04W 76/15 |
| 2019/0028249 A1 | 1/2019 | Rost et al. | |
| 2019/0349974 A1* | 11/2019 | Sundararajan | H04W 72/21 |
| 2020/0280960 A1* | 9/2020 | Liu | H04W 72/02 |
| 2021/0282103 A1* | 9/2021 | Zhu | H04W 76/15 |

FOREIGN PATENT DOCUMENTS

| | | |
|---|---|---|
| GB | 0508801 | 6/2005 |
| JP | 2012173869 A | 9/2012 |
| WO | 2009074072 A1 | 6/2009 |
| WO | 2011062596 A1 | 5/2011 |
| WO | 2012140309 A1 | 10/2012 |
| WO | 20140130764 A1 | 8/2014 |
| WO | WO-2014/169860 A1 | 10/2014 |
| WO | WO-2015/061181 A1 | 4/2015 |
| WO | 2016125983 A1 | 8/2016 |
| WO | WO-2016/124983 A1 | 8/2016 |

OTHER PUBLICATIONS

The First Office Action of the Chinese National Intellectual Property Administration for Chinese Patent No. 202080028047.2 mailed on Nov. 15, 2022.
Office action in related Chinese application 202080028047.2 dated Feb. 7, 2024, pp. 1-6.
Office action in related Chinese application 202080028047.2 dated May 31, 2023, pp. 1-9.

* cited by examiner

DYNAMIC RESOURCE ALLOCATION ACROSS MULTIPLE NETWORK SERVICE PROVIDERS

FIELD OF THE DISCLOSURE

This disclosure relates to cellular communications and, more particularly, to dynamically allocating resources across networks operated by multiple network service providers.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A subscription to a certain network service provider (also commonly referred to as "network provider" or "network operator") enables a user device access to resources of that network service provider. Generally, network service providers offer different types and qualities of service, coverage areas, frequency band combinations, etc. Moreover, availability of resources can quickly change, and one network service provider can offer more resources than another network service provider at a certain geographic location at one time, and fewer resources that the other network service provider at the same geographic location at a later time.

Some existing technologies enable user devices to access resources of multiple network service providers. However, these technologies are limited. For example, the Dual SIM Dual Standby (DSDS) technology allows a user device to manage two Subscriber Identification Module (SIM) cards at the same time, but the user device can establish connections using only SIM card at a time, with the other SIM card standing by. As another example, the Dual SIM Dual Active (DSDA) technology allows a user device to be active on two Long Term Evolution (LTE) networks at the same time, but requires that the user device use different identities to access the respective networks, and accordingly establish different respective contexts in these networks. As yet another example, a certain virtual mobile network allows users to access multiple networks with a single identity, but requires that the user switch between networks, so that only one connection is active at any one time.

SUMMARY

The techniques of this disclosure allow a user device (or user equipment, "UE") to utilize resources from multiple network service providers (or simply "network providers") in a single communication session using a single user identity or context. In some cases, these techniques allow the user to utilize these resources concurrently.

More specifically, a user device this disclosure can connect to, or register with, multiple networks operated by different respective network providers. The network providers in some implementations share at least some of the physical devices (e.g., base stations) and resources using virtualization techniques such as network slicing. In other implementations, the network providers support their respective hardware resources. Each network provider can operate on a carrier frequency band ("radio carrier" or "RF carrier") allocated specifically to the network provider and, in some cases, in one or more bands of the unlicensed spectrum.

The user device in some scenarios concurrently communicates with multiple base stations, each connected to a respective core network (CN). When multiple base stations support a single communication session, the base stations can support the same radio access technology (RAT) such as EUTRA or NR, for example, or different RATs. The CNs involved in a single communication session can be of the same CN type or different CN types (5GC/5GC, EPC/EPC, 5GC/EPC, etc.). To connect to or register with multiple network service providers, the user device can communicate with respective Access Management Functions (AMFs).

The user device in some implementations receives real-time indications of availability and quality of resources at each of the network service providers. For example, a base station can transmit network broadcast information that indicates at least some of energy-per-bit, spectrum efficiency, network capacity, and congestion for a certain radio carrier and core network. Based on the network broadcast information, the user device implements a real-time "auction" to determine how to utilize different sets of resources across the network service providers to concurrently support a single communication session. In some cases, the UE evaluates resources on a per-service basis and determines which services to request from which network service provider.

Alternatively, a network device determines which resources and/or services to request from which network service provider, based on energy-per-bit, spectrum efficiency, network capacity, congestion, etc. The network device can be a component of the first core network, a component of the second core network, or a server coupled to the first core network and the second core network.

In other implementations, the user device and/or a network device implements a real-time auction to select one service provider from among the multiple services providers, without combining the resources from the multiple services providers.

In some implementations, a component that can be referred as a Dynamic Network Allocation Proxy server (the "allocation proxy server") interfaces with respective AMFs of a core network of the corresponding service provider and facilitates authentication of the user device. The user device in at least some of the implementations uses the same identity to connect with two or more CNs. The allocation proxy server also can determine which network resources to request from each core network and/or which network services to enable for the user device at each core network. The allocation proxy server then can request the network service providers to allocate respective sets of resources according to the determined resource allocation scheme. The network service providers can allocate sets of resources as network slices to support simultaneous aggregation of resources.

The allocation proxy server in some implementations routes control plane and user plane traffic between the core network. In one example scenario, the user device establishes a communication session using resources from two CNs of different respective network providers, exchanges control plane data with one CN, and concurrently exchanges user plane data with the other CN. In another example scenario, the user device establishes a communication session using resources from two CNs of different respective network providers and exchanges user plane data with one CN as well as the other CN. For example, the user device can request a relatively large file from a remote host and receive a portion of the file from the first CN and another portion of the file from the other CN.

In some implementations, the allocation proxy server also can obtain information indicative of availability and quality and resources from the core networks and determine how to allocate the sets of resources to support the communication session. The allocation proxy server may dynamically enable or disable resources across the network service providers as needed.

These techniques therefore enable user devices and/or components of the cellular infrastructure to dynamically select network resources. Additionally, multiple network service providers can utilize these techniques to combine their individual spectrum assets to create a larger spectrum available for communication sessions.

Further, the allocation proxy server (or another component in communication with at least two core networks operated by different respective service providers) in some cases allows a UE to hand over an existing communication session, such as a data call or a video call, from one network provider to another network provider. More generally, the allocation proxy server allows a UE to obtain a certain context (e.g., a temporary identity granted by a core network, an encryption key, a set of resources for routing a packet call) when communicating with the network operated by the first network provider and retain at least a portion of the context when communicating with another network operated by a different, second network provider. To support this functionality, the allocation proxy server can keep track of resources one network provider assigns to a UE and negotiate the use of the same resources with the other network provider or create and maintain a mapping between resources of multiple network providers, so that the context appears unchanged to the UE.

One example embodiment of these techniques is a method for utilizing network resources, executed by processing hardware in a user device and/or a network device. The method includes allocating (i) a first set of network resources associated with a first network provider that operates a first core network and utilizes a first radio carrier and (ii) a second set of network resources associated with a second network provider that operates a second core network and utilizes a second radio carrier. The method further includes combining the first set of network resources and the second set of network resources to generate a combined set of network resources and using the combined set of network resources to transmit data between a user device and the first core network and between the user device and the second core network, concurrently in a same communication session.

Another example embodiment of these techniques is a method for concurrently utilizing resources of multiple network providers. The method can be executed by processing hardware in a network server. The method includes receiving an indication that a user device is connected via at least one base station using a same identity, to (i) a first core network associated with a first service provider, over a first radio carrier, and (ii) a second core network associated with a second service provider, over a second radio carrier; and establishing a communication session, including allocating a first set of network resources of the first service provider and allocating a second set of network resources of the second service provider, to cause the user device to the first set of network resources and the second set of network resources concurrently for receiving downlink data and/or transmitting uplink data during the communication session.

Yet another embodiment of these techniques is a method for using resources of multiple network providers. The method can be executed by processing hardware in a user device. The method includes establishing a first connection with a first core network associated with a first service provider to support a communication session, including receiving a resource from the first core network, establishing a second connection with a second core network associated with a second service provider, using the resource, to support the communication session, and maintaining the communication session between the user device and the second core network after the first connection is released.

Still another embodiment of these techniques is a method for selecting a network provider. The method can be executed by processing hardware in a user device. The method includes receiving a first real-time indication of resources available at a first network provider that operates a first core network and utilizes a first radio carrier; receiving, at the user device, a second real-time indication of resources available at a second network provider that operates a second core network and utilizes a second radio carrier; selecting, based on the first real-time indication and the second real-time indication, (i) a first set of network resources associated with the first network provider and (ii) a second set of network resources associated with the second network provider; and using the first set of network resources and the second set of network resources to respectively transmit data between the user device and the first core network and between the user device and the second core network. Generally, the processing hardware selects both the first set of network resources and the second set of network resources based on both the first real-time indication and the second real-time indication.

Another embodiment of these techniques is a method for accessing resources of multiple network providers. The method can be executed by processing hardware in a user device. The method includes connecting, using an identity of the user device, to a first core network associated with a first network provider, to activate a first network connection; connecting, using the same identity, to a second core network associated with a second network provider without disconnecting from the first core network, to activate a second network connection concurrent with the first network connection; and accessing a service at the second core network while the first network connection remains active

DETAILED DESCRIPTION OF THE DRAWINGS

Figure 1A:
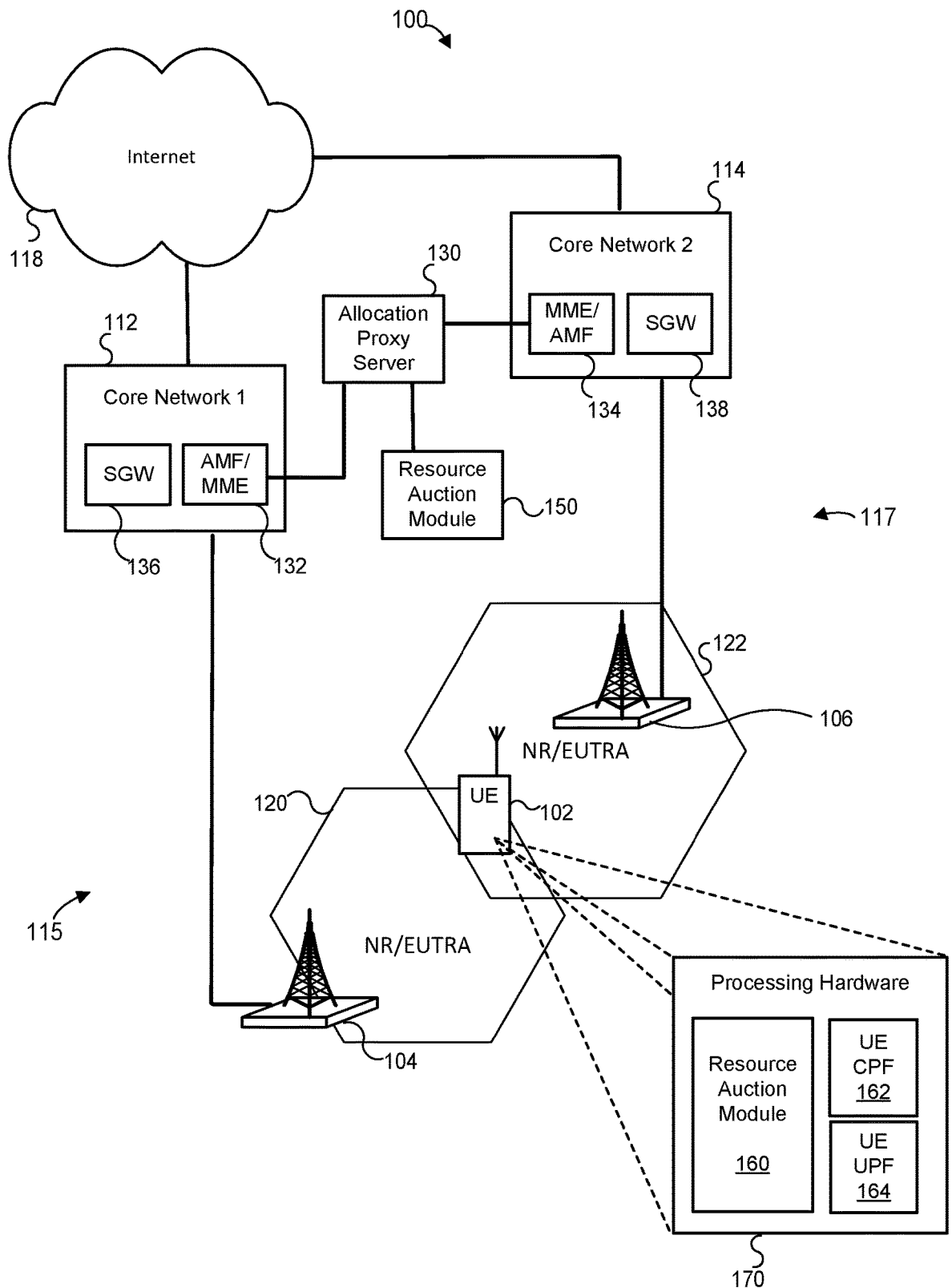
FIG. 1A is a block diagram of an example environment in which a user device can utilize resources of multiple networks operated by different respective network providers, in accordance with the techniques of this disclosure.
Figure 1B:
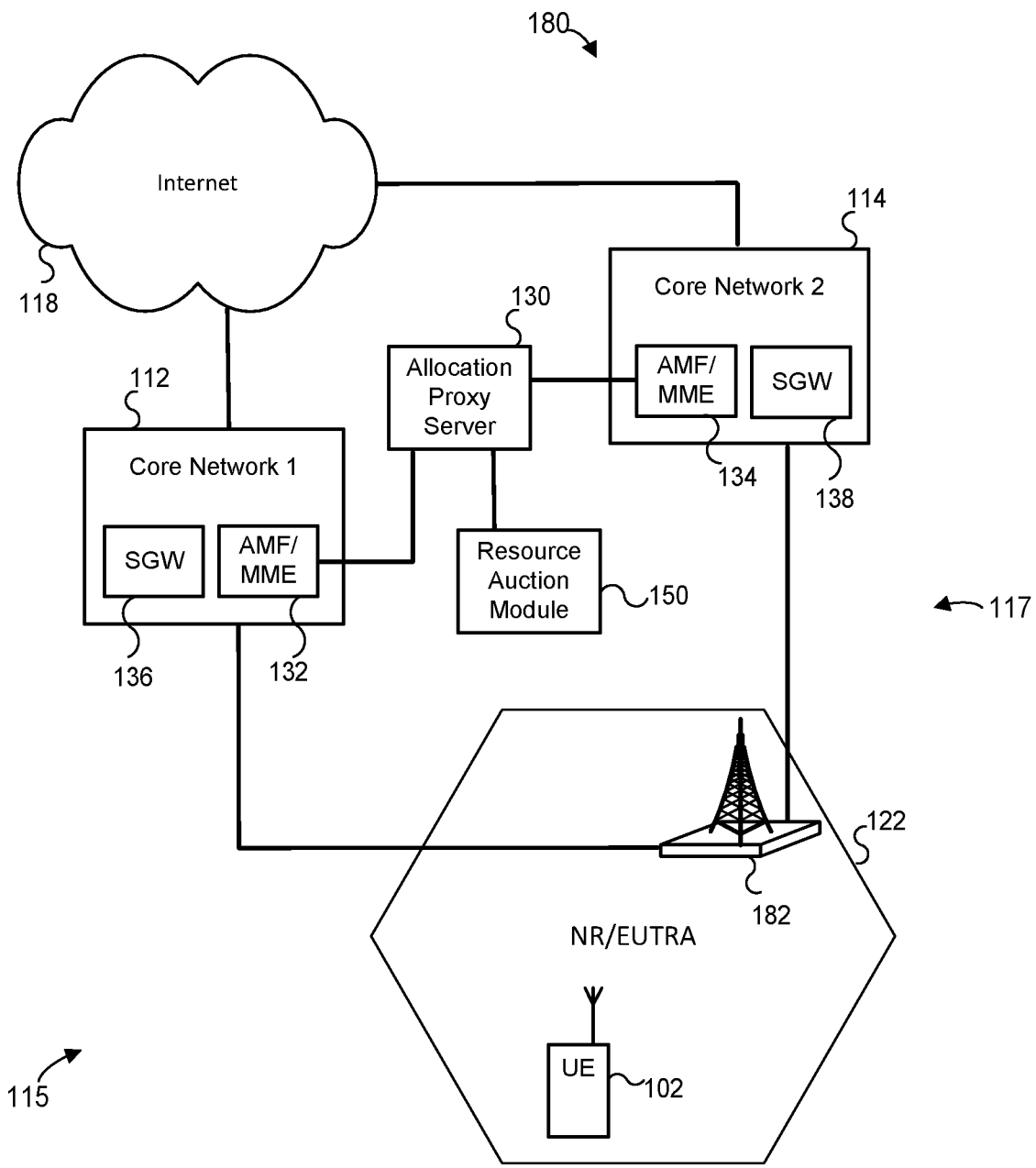
FIG. 1B is a block diagram of another example environment in which these techniques can be used.

FIGS. 1A and 1B depict different implementations of an example environment 100 in which a user device and/or a network device can allocate sets of network resources across multiple network providers using the techniques of this disclosure. As discussed in more detail below, the user device and/or the network device can determine how to allocate the sets of network resources based on real-time indications of resources available at the respective network providers. In some implementations, the user device and/or the network device can combine the sets of network resources and use the combined sets of network resources to transmit and/or receive data in the same communication session, which can correspond to the same user context or identity.

Referring first to FIG. 1A, a UE 102 can be any suitable device capable of wireless communications, as further discussed below. The environment 100 includes a first base station 104 connected to a first core network 112 associated with a first network provider 115 (or "authority"), and a second base station 106 connected to a second core network 114 associated with a second network provider or authority 117. The network providers can manage their core networks and their base stations separately and independently of each other, and these core networks may not be interconnected for the purposes of exchanging control data except via an allocation proxy server 130 of this disclosure. The first core network 112 and the second core network 114 also can be connected to the Internet 118.

In some implementations, each of the first base station 104 and the second base station 106 can be a EUTRA or 5G NR (or simply, "NR") base station, and each of the first core network 112 and the second core network 114 can be an EPC or a 5GC, for example. Accordingly, each of the first base station 104 and the second base station 106 can operate as a next-generation evolved Node B (ng-eNB) in those implementations where the respective core network 112, 114 is an EPC, or as a next-generation Node B (gNB) in those implementations where the respective core network 112, 114 is a 5GC. More generally, the base stations 104 and 106 can operate using any suitable RAT, and the core networks 112 and 114 can be of any suitable CN type, and the base stations and the core networks can conform to any suitable 4G, 5G, 6G, etc. technology.

The first base station 104 covers a cell 120 which can be a EUTRA cell or an NR cell, and the second base station 106 covers a cell 122 which can be a EUTRA cell or an NR cell, for example. As illustrated in FIG. 1A, at least a portion of the cell 120 overlaps with at least a portion of the cell 122, such that when the UE 120 is located within the overlapped portion (i.e., the UE 120 is located within both of the cells 120, 122), the UE 120 can connect to, and exchange messages with, both of the base stations 104, 106.

The UE 102 in various implementations can support a EUTRA air interface, an NR air interface, or both EUTRA and NR. When the UE 102 operates in a EUTRA cell, the UE 102 exchanges messages with the base stations 104, 106 using the EUTRA air interface. When the UE 102 operates in an NR cell, the UE 102 exchanges messages with the base stations 104, 106 using the NR air interface.

In general, the wireless communication network 100 can include any number of base stations, and each of the base stations can cover one, two, three, or any other suitable number of cells.

The first core network 112 can include a component 132 configured to manage authentication, registration, paging, and other related functions. The component 132 can be a Mobility Management Entity (MME) when the first core network 112 is an EPC, or an AMF when the first core network 112 is a 5GC, for example. The second core network 114 can include a similar component 134. Further, the first core network 112 can include a component 136 configured to transfer user-plane packets related to audio calls, video calls, Internet traffic, etc. The component 136 in an example implementation operates as a Serving Gateway (SGW) in an EPC and interacts with a Packet Data Network Gateway (PGW). In another implementation, the component 136 operates as a user-plane SGW (SGW-U) in a 5GC. The components 132 and 136 in some implementations can execute control-plane and user-plane functions, respectively. A component 138 can operate in the core network 114 to implement functionality similar to that of the component 136.

An allocation proxy server 130 can operate separately from the core networks 112 and 114 or as a component of one of these networks. In the implementation illustrated in FIG. 1A, the allocation proxy server 130 is communicatively coupled to each of the core networks 112 and 114 via a respective wired or wireless link. Generally, the allocation proxy server 130 can allocate a first set of network resources associated with the first core network 112 and a second set of network resources associated with the second core network 114, for concurrent use by the UE 102. For example, the allocation proxy server 130 can initiate or create a first network slice within the first core network 112 and a second network slice within the second core network 114, as discussed in more detail below. Accordingly, the UE 102 may communicate with the first core network 112 and the second core network 114 via the first network slice and the second network slice, respectively.

The environment 100 further can include a resource auction module 150 operating as a component of one of the core networks 112, 114, as a component of the proxy allocation server 130, or a separate entity as depicted in the example of FIG. 1A. In some implementations or scenarios, the resource auction module 150 can determine which of the cells 120 and 122, and/or which of the core networks 112 and 114 offers better resources for a communication session which the UE 102 has requested, and how these resources can be combined. These scenarios are discussed in more detail below with reference to FIG. 5. In other implementations or scenarios, the UE 102 makes this determination using a resource auction module 160.

More particularly, the core network 112 and/or the base station 104 can generate real-time indications of availability of radio interface resources and other resources controlled by the core network 112, etc., and the core network 114 and/or the base station 106 similarly can generate real-time indications of availability of various resources at the core network 114. This information may include various metrics and parameters, such as energy-per-bit expenditure, network capacity, spectrum efficiency, and congestion information. As a more specific example, the base stations 104 and 106 can perform measurements for the corresponding radio interfaces, and components of the core networks 112 and 114 can measure latency, capacity, and cost associated with endpoint-to-endpoint communications. The base stations 104, 106 and/or the core networks 112, 114 can transmit these indications to the resource auction module 150 operating as a part of the cellular infrastructure or to the resource auction module 160 operating in the UE 102.

In some implementations, the base stations 104 and 106 periodically broadcast the real-time indications of availability of various resources through the respective cells. To this end, the base stations 104 and 106 can utilize System Information Block (SIB) messages, for example.

With continued reference to FIG. 1A, the UE 102 is equipped with processing hardware 170 that can include one or more general-purpose processors (e.g., CPUs) and a non-transitory computer-readable memory storing instructions that the one or more general-purpose processors execute. Additionally or alternatively, the processing hardware 170 can include special-purpose processing units. In addition to the resource allocation module 160 discussed above, the processing hardware 170 can include UE control-plane functions (UE CPF) 162 and UE user-plane functions (UE UPF) 164. Generally speaking, the UE CPF 162 can include registration, authentication, establishing packet-based connections, etc. related to such protocol layers or sub-layers as radio resource control (RRC), mobility management (MM), etc. The UE UPF 164 can support such sub-layers as packet data convergence protocol (PDCP), radio link control (RLC), medium access control (MAC), etc. and include functions for generating, routing, and processing data packets for various applications.

Although illustrated in FIG. 1A in a highly simplified manner, the core networks 112 and 114 can include or be connected to various other components such as an Internet Protocol (IP) Multimedia System (IMS) that supports audio calls and video calls, for example. Depending on the implementation, the core networks 112 and 114 can use the same IMS or different instances of an IMS.

FIG. 1B illustrates an example environment 180 that is generally similar to the environment 100, except that the core networks 112 and 114 in this implementation are connected to a shared base station 182, which can be an eNB, an ng-eNB, or a gNB, for example. The core networks 112 and 114 can use any suitable virtualization technique such as network slicing to share the resources of the base station 182. More generally, network providers can use virtualization techniques to share components of core networks, base stations, and the radio spectrum.

Figure 2:
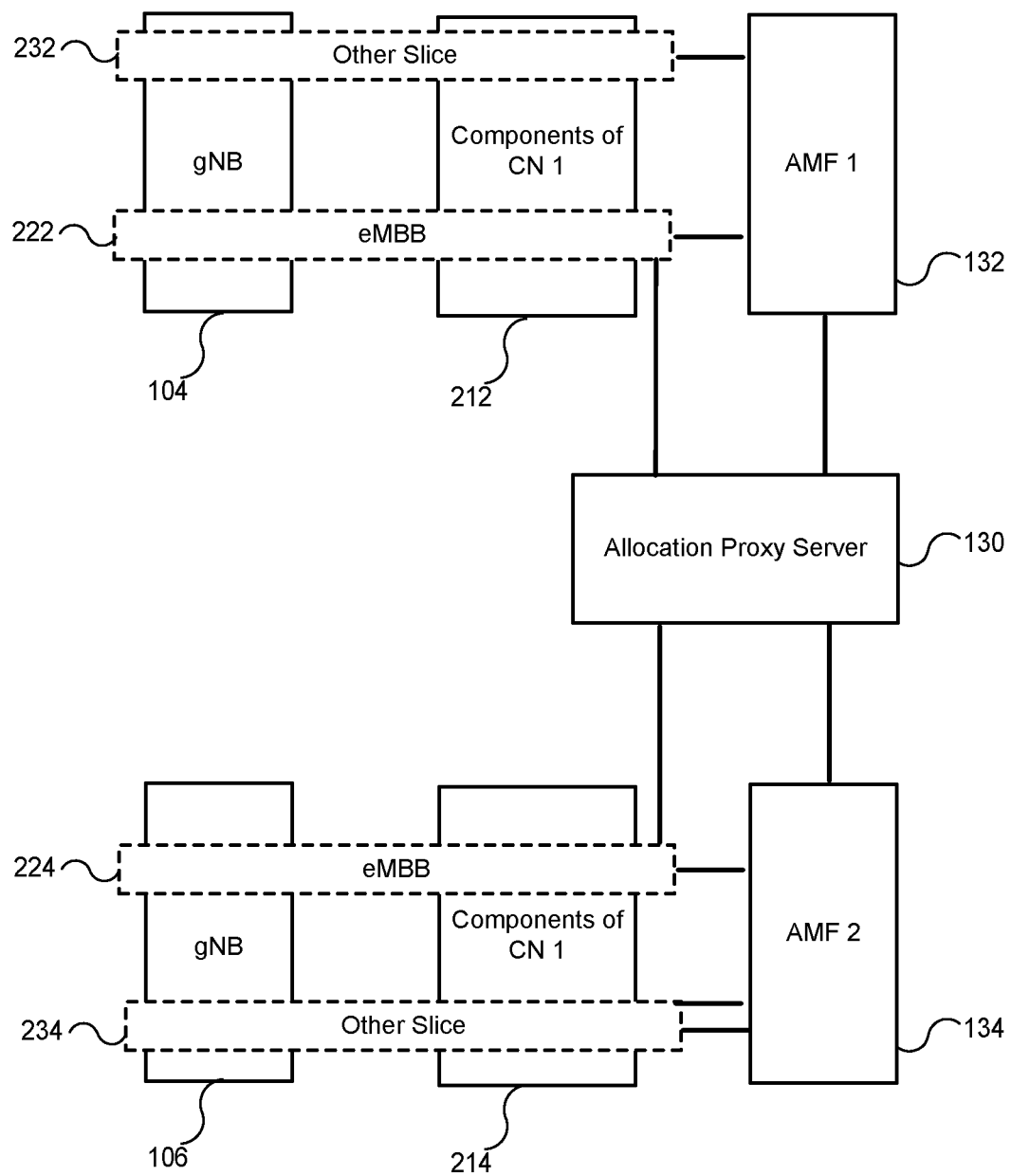
FIG. 2 schematically illustrates a communication session that involves network slices from networks operated by different respective network operators, which a user device and/or a network device of FIGS. 1A-B can set up.

Next, FIG. 2 schematically illustrates a communication session 200 that involves resources controlled by two different network providers or authorities 115, 117. The first network provider 115 operates the base station 104, the AMF 132, and other core network components 212. The second network provider 117 operates the base station 106, the AMF 134, and other core network components 214. The core network components 212 and 214 can include entities configured to process data packets (e.g., SGW-U, SGW-C, IMS). In this example implementation, each of the base stations 104 and 105 is a gNB, and the core network components 212 and 214 perform various control-plane and user-plane functions of the core networks 112 and 114, respectively.

The communication session 200 is an aggregation of an enhanced mobile broadband (eMBB) slice 222, which the first base station 104 and the core network components 212 provide, with an eMBB slice 224, which the second base station 106 and the core network components 214 provide. The base stations 104, 106 and the components 212, 214 also can concurrently allocate slices 232 and 234 to other communication sessions. Referring back to FIG. 1A, the UE 102 can concurrently register with the AMF 132 and the AMF 134 by performing the 5GS NAS registration procedure with both core networks (as discussed below, the UE 102 in some cases uses the same identity when registering with the two AMFs). The allocation proxy server 130 communicates with the AMF 132 and the AMF 134 to coordinate the aggregation of the slices 222 and 224 into the communication session 200. More particularly, the allocation proxy server 130 can facilitate allocation, maintenance, and release of the resources which the network slices 222, 224 utilize. Further, during the communication session 200, the allocation proxy server 130 can facilitate synchronization between the network slices 222 and 224.

In the example of FIG. 2, the communication session 200 is based on 5G-5G network slice aggregation. More generally, the techniques of this disclosure can be applied to 4G-4G network slice aggregation, 4G-5G network slice aggregation, 5G-6G network slice aggregation, etc.

Next, several example scenarios in which a UE uses resources dynamically allocated across networks operated by different network providers are discussed with reference to FIGS. 3-7. Although these scenarios are discussed with example reference to the components of FIGS. 1A-B, in general these techniques can be implemented in various user devices, base stations supporting various RATs, and core networks of various CN types.

Figure 3:
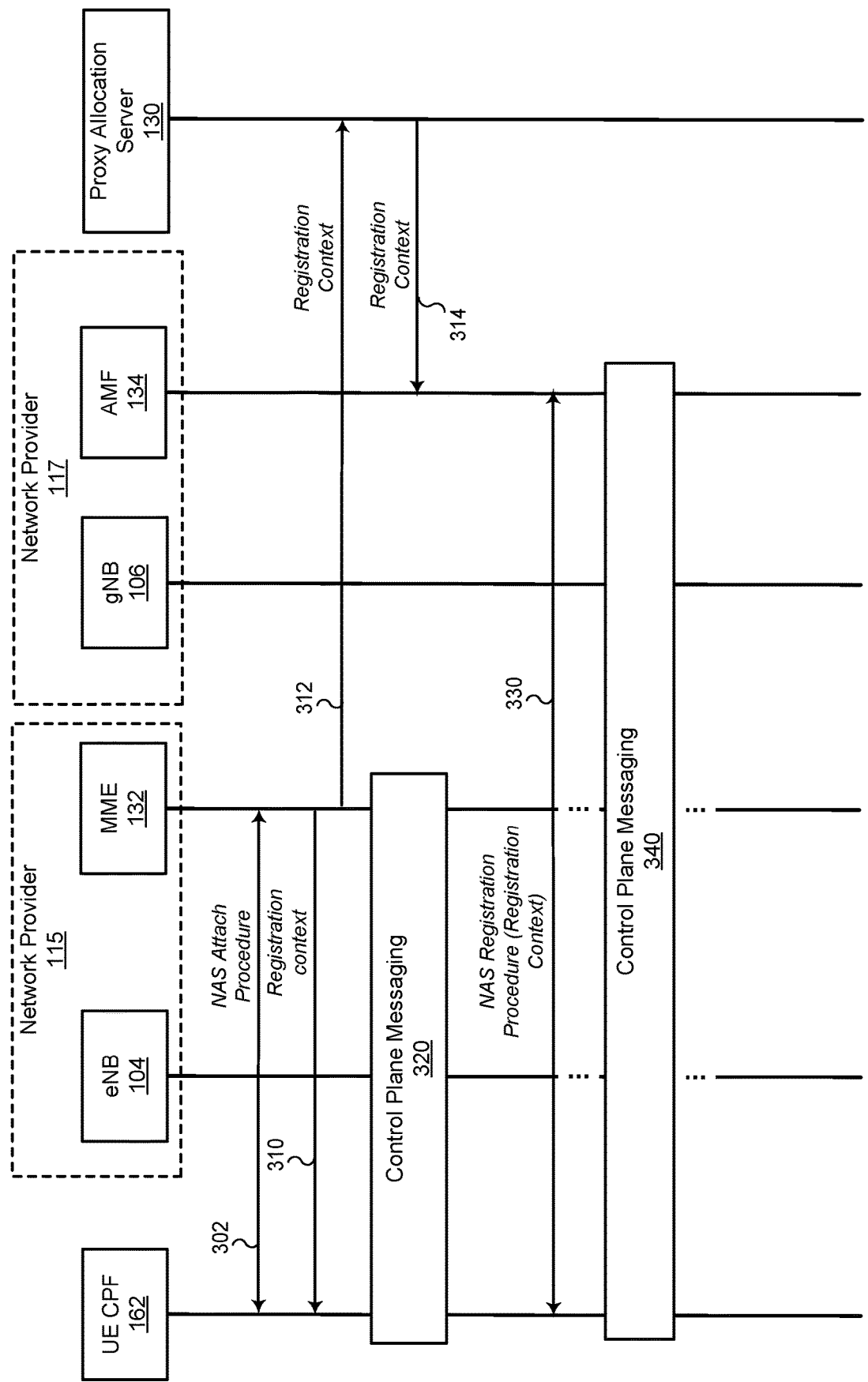
FIG. 3 is a messaging diagram of an example scenario in which a user device obtains a registration context from one core network and uses this registration context to also register with another core network operated by a different network operator.

Referring first to FIG. 3, the UE 102 in this example scenario obtains a registration context from one core network and uses this registration context to also register with another core network operated by a different network operator. In this example, the first core network is an EPC, and the second core network is a 5GC. More particularly, the UE CPF 162 performs 302 the NAS Attach procedure with the MME 132 of the first network provider 115 and obtains 310 a registration context, which can include a temporary identity, encryption information, etc. The MME 132 then forwards 312 the registration context to the proxy allocation server 130, which in turn forwards 314 the registration context to the AMF 134 of the second network provider 117. In this manner, the proxy allocation server 130 facilitates synchronization of a registration context across the network providers 115 and 117.

The UE CPF 162 can exchange 320 control-plane messages with the MME 132 and other components of the core network in which the MME 132 operates. After the AMF 134 obtains the registration context from the proxy allocation server 130, the AMF 134 performs 330 an NAS Registration procedure with the UE CPF 162, so that the UE CPF 162 can exchange 340 control-plane messages also with the AMF 134 and other components of the core network in which the AMF 134 operates. In this manner, the UE CPF 162 can establish respective control planes with core networks operated by separate network providers 115 and 117. The CPF 162 can maintain these control planes concurrently.

In other implementations, the UE CPF 162 can provide the registration context 314 directly to the AMF 134 after obtaining the registration context from the MME 132. The MME 132 and the AMF 134 then can exchange corresponding messages via the proxy allocation server 130 to synchronize the registration context across the network providers. Further, although the scenario of FIG. 3 involves an EPC and a 5GC, the UE CPF 162 in another scenario similarly can establish concurrent control planes with two EPCs, two 5GCs, etc.

Figure 4:
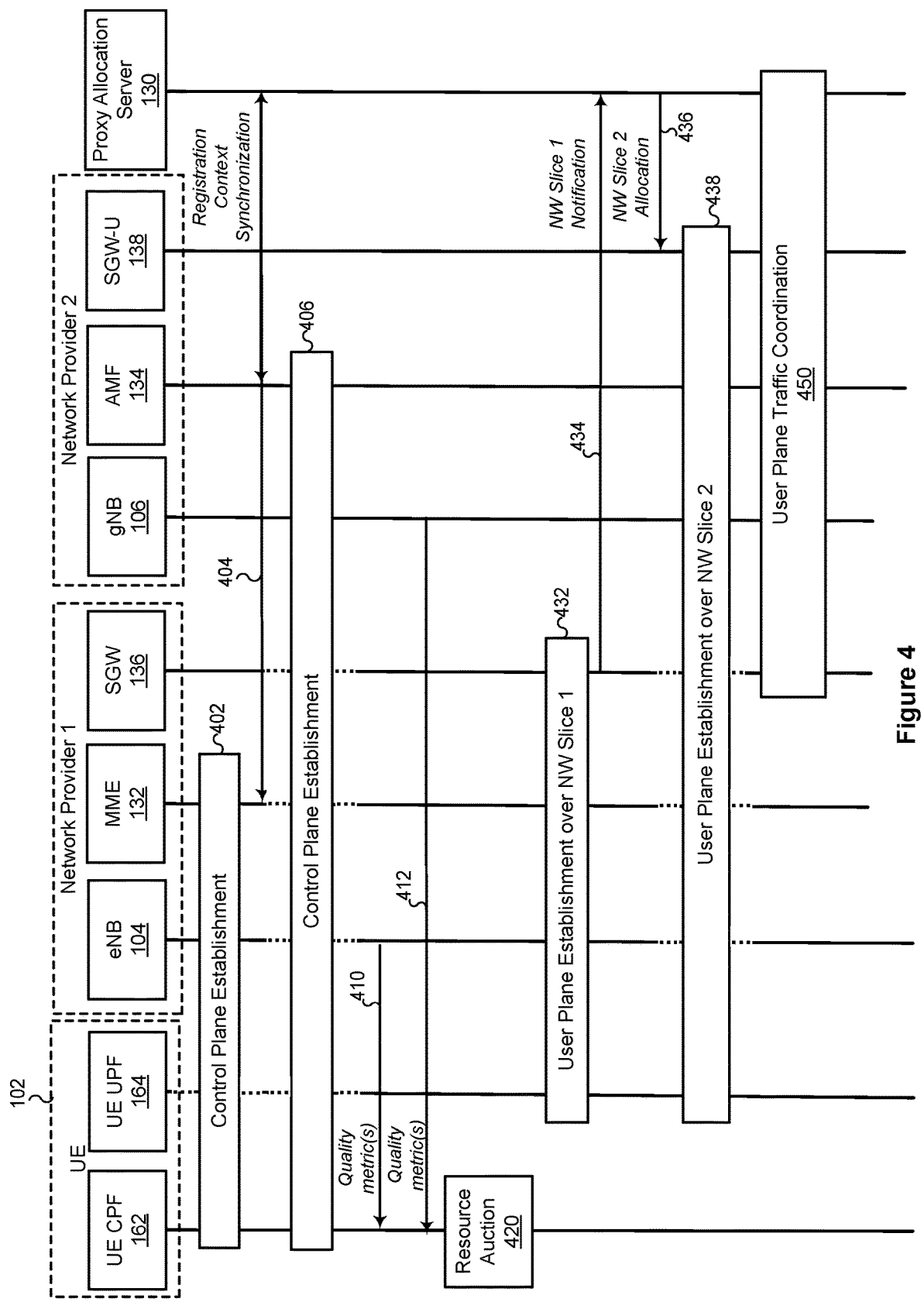
FIG. 4 is a messaging diagram of an example scenario in which a user device conducts a real-time "auction" to select resources available at two networks operated by different respective network operators.

In the scenario depicted in FIG. 4, the user device conducts a real-time "auction" to select resources available at two networks operated by different respective network operators. Similar to the scenario of FIG. 3, the network providers 115 and 117 operate an eNB coupled to an EPC and a gNB coupled to a 5GC, respectively. Also similar to the scenario of FIG. 3, the UE CPF 162 first establishes 402 a control plane with the MME 132 of the first network provider 115, and the proxy allocation server 130 facilitates 404 synchronization of the registration context between the MME 132 and the AMF 134. The UE CPF 162 then establishes 406 a control-plane connection with the AMF 134 operated by the second network provider 117.

The UE CPF 162 can receive 410, 412 one or more real-time quality metrics from the eNB 104 and the gNB 106. For example, the quality metrics can indicate energy-per-bit expenditures in the corresponding cell, a particular frequency carrier, a particular sub-band, etc. Additionally or alternatively, the quality metrics can indicate one or more of spectrum efficiency, network efficiency, congestion, etc. In at least some of the implementations, the quality metrics include, or operate as, real-time indications of resources available at the corresponding network. The eNB 104 and the gNB 106 in various implementations can broadcast the quality metrics in advertisement frames (in which case the UE CPF 162 can receive 410, 412 the quality metrics prior to establishing 402, 404 control-plane connections) or transmit these metrics specifically addressed to the UE 102. In any case, using these quality metrics, the UE CPF 162 can select 420 the eNB 104 and the corresponding EPC, the gNB 106 and the corresponding 5GC, or respective network slices via both the eNB 104 and the gNB 106. In some cases, the selection 420 can include a resource "auction," and the UE CPF 162 can exchange additional messages with the eNB 104 and the gNB 106 to generate additional quality metrics or request additional information from the eNB 104 and the gNB 106 to make a selection.

After the UE CPF 162 dynamically determines which network resources it should request for a communication session, the UE UPF 164 sets up 432, 438 respective user-plane connections with the SGW 136 and the SGW-U 138 of their respective networks. In this example implementation, the UE CPF 164 requests a first network slice from the SGW 136 in accordance with the selection 420; the SGW 136 then provides 434 an indication of the allocated network slice to the proxy allocation server 130, which in turn directs 436 the SGW-U 138 to allocate another network slice. The UE CPF 164 then combines the network slices and uses 450 the combined network slices in a same communication session. The proxy allocation server 130 coordinates user-plane traffic between the core networks. The resulting communication session can be understood as a dual user-plane function.

In another example implementation, the UE CPF 162 reports the results of the selection 420 to the proxy allocation server 130. In response, the proxy allocation server 130 provides the corresponding indications to the SGW 136 and the SGW-U 138 to assist in the two user plane establishment processes 432, 438. In yet another implementation, the UE CPF 162 directly establishes the user-plane connections both with the SGW 136 and the SGW-U 138, and the entities 136, 138 report the allocation of network slices to the proxy allocation server 130 to assist in user plan traffic and coordination 450. More generally, the UE 102 can negotiate the allocation and subsequent maintenance of network resources across multiple network providers 115 and 117 in any suitable manner.

Figure 5:
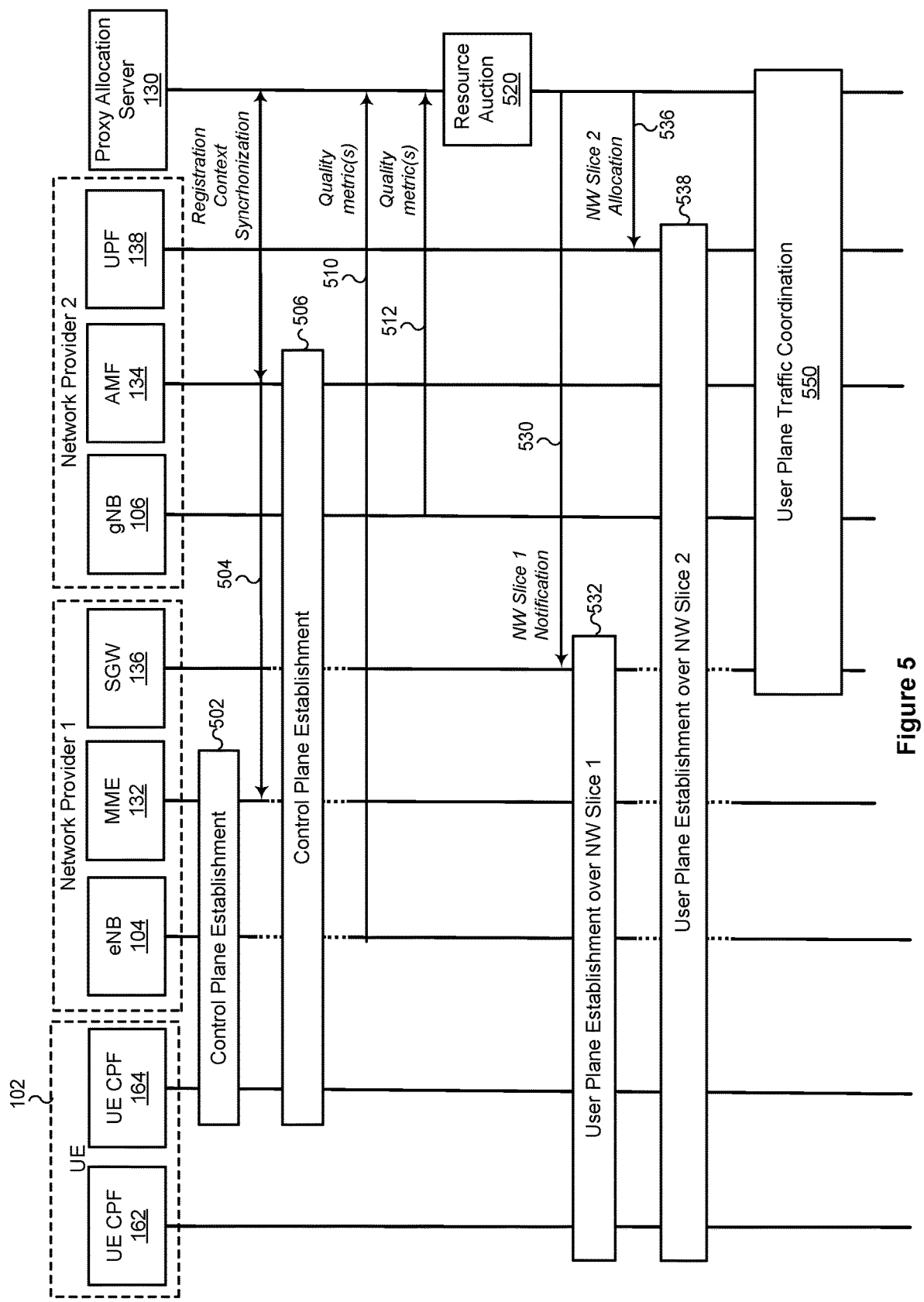
FIG. 5 is a messaging diagram of an example scenario in which a network device conducts a real-time auction to select resources available at two networks operated by different respective network operators.

Now referring to FIG. 5, the scenario reflected in this diagram is generally similar to that of FIG. 4, except that the real-time auction of network resources takes place at a network device rather than at the user device. In particular, the procedures and messages 502, 504, and 506 are similar to the procedures and messages 402, 404, and 406, respectively. Rather than providing these quality metrics to user devices such as the UE 102, the eNB 104 and the gNB 106 in this scenario provide 510, 512 the quality metrics to the proxy allocation server 130, which then makes a selection 520. The selection in general can include resources of the network provider 115, the network provider 117, or both.

The proxy allocation server 130 in this scenario notifies 530 the SGW 136 of allocation of one network slice, and further notifies 536 the SGW-U 138 of allocation of another network slice. The SGW 136 and the SGW-U 138 establish 532, 538 respective user-plane connections with the UE CPF 164. The proxy allocation server 130 then coordinates 550 user-plane traffic between the core networks.

Referring to both FIGS. 4 and 5, the UE 102 in some cases can generate additional or alternative real-time quality metrics and provide these quality metrics to the eNB 104 and he gNB 106, or use these additional or alternative quality metrics to select network resources.

In the scenarios of FIGS. 4 and 5, the UE 102 uses resources of both networks concurrently. For example, the UE UPF 164 can include transfer of a large high-definition video file over both the network slice allocated by the first network provider 115 and the network slice allocated by the second network provider 117, so that the UE 102 can utilize the resources of both networks at the same time, and thus download the file faster. In other scenarios, the UE 102 can utilize the resources of only one of the network providers 115 and 117 at a time, but the proxy allocation server 130 can allow the UE 102 to seamlessly transfer or hand over a user-plane session to another network.

Figure 6:
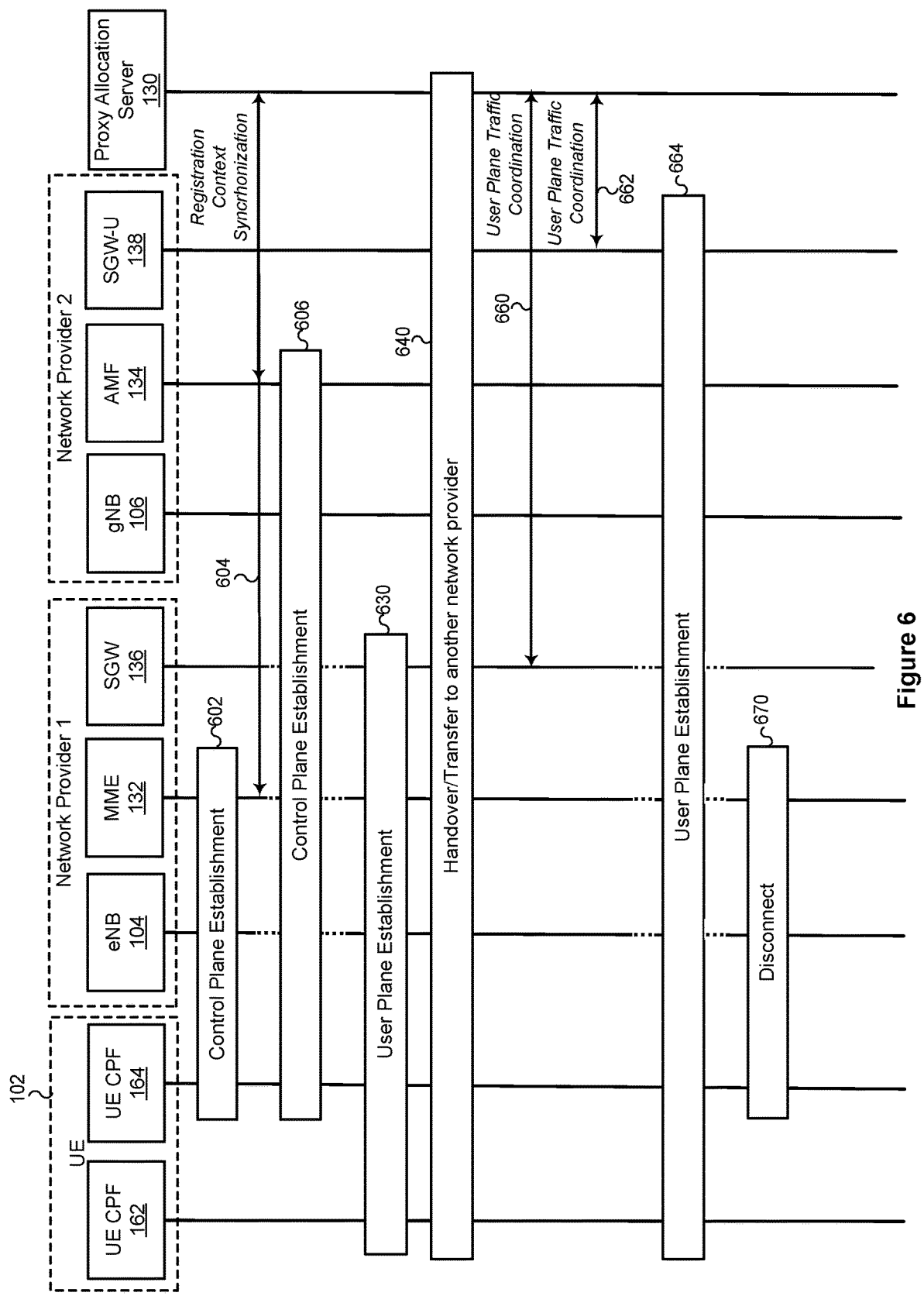
FIG. 6 is a messaging diagram of an example scenario in which a network device establishes a user-plane connection with one core network operated by a certain network provider, and the proxy allocation server facilitates transfer or handover of the user-plane connection to another core network operated by a different network provider.

For example, FIG. 6 illustrates an example scenario in which a network device establishes a user-plane connection with one core network operated by a certain network provider, and the proxy allocation server facilitates transfer or handover of the user-plane connection to another core network operated by a different network provider. As illustrated in FIG. 6, the UE CPF 162 establishes 602 a control-plane connection with the MME 132, and the proxy allocation server 130 facilitates 604 synchronization of the registration context between the MME 132 and the AMF 134. The UE CPF 162 establishes 606 a control-plane connection with the AMF 134 operated by the second network provider 117. The UE UPF 164 then establishes 630 a user-plane connection with the SGW 136.

In another scenario, the UE 102 first establishes 602, 630 both control-plane and user-plane connections to the core network of the first network operator 115, and subsequently establishes 606 the control-plane connection with the other core network when the UE 102 reselects from the cell 120 to the cell 122, for example.

The UE CPF 162 can negotiate 640 a transfer or a handover procedure from the EPC operated by the first network provider 115 to the 5GC operated by the second network provider 117. The proxy allocation server 130 can facilitate the transfer or handover procedure so that the UE 102 can maintain the communication session over the user plane (e.g., a phone call, a video call, file download, audio or video streaming, web browsing). For example, the proxy allocation server 130 can route some of the data packets from the UE 102 to both the SGW 136 and the SGW-U 138 during this procedure. The proxy allocation server 130 can coordinate 660, 662 user-plane traffic with the SGW 136 and the SGW-U 138.

The UE 102 can then establish 664 a user-plane connection with the SGW-U 138. After the UE CPF 164 and the MME 132 release 670 the control-plane connection (and, accordingly, the user-plane connection established at 630), the UE 102 can seamlessly continue to communicate 680 using the resources of the second network provider 117. Thus, in the scenario of FIG. 6, the UE 102 can utilize network slices of the network providers 115, 117 in a single communication session and then fallback on the network slice of only one of the network providers 115, 117 without disconnecting.

Figure 7:
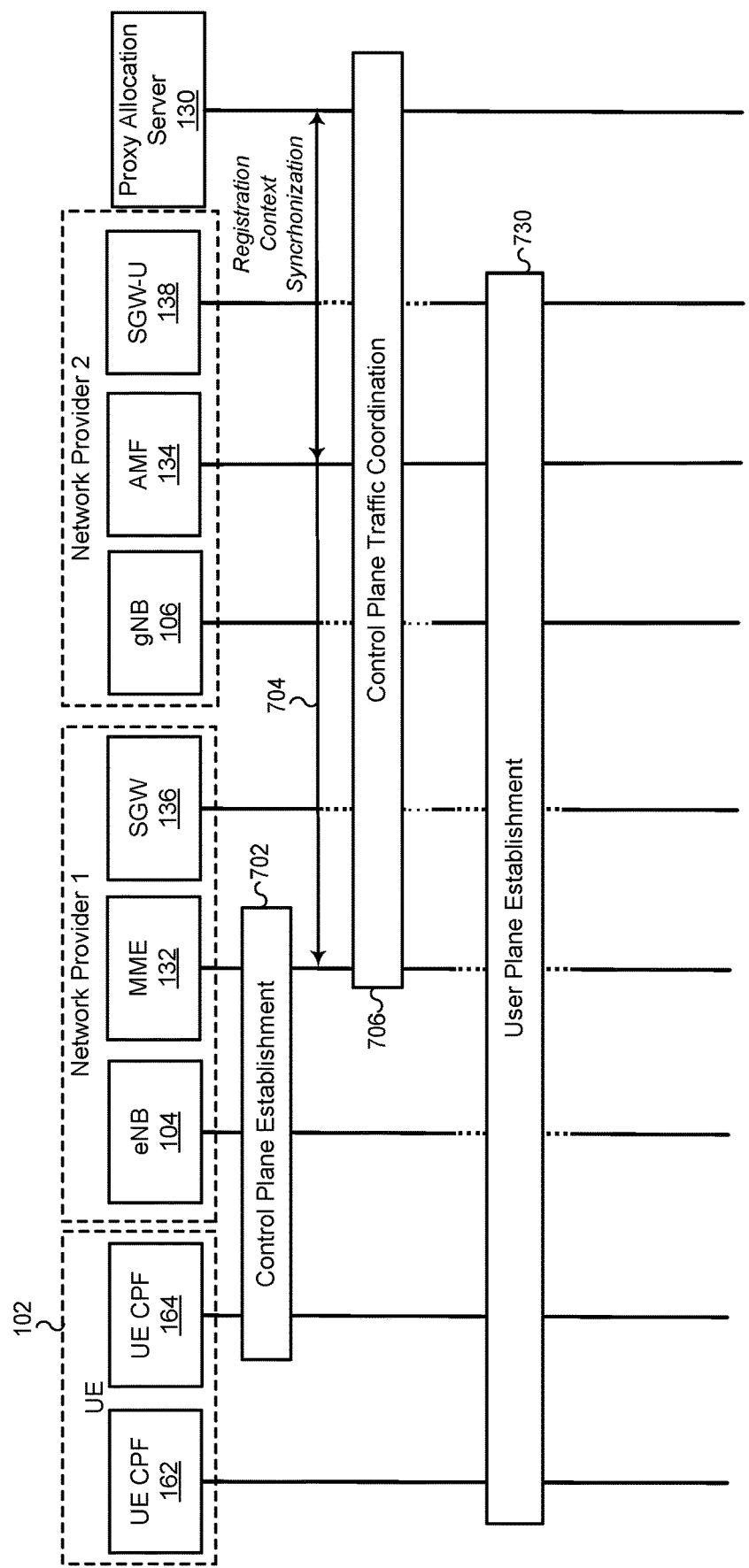
FIG. 7 is a messaging diagram of an example scenario in which a network device establishes a control-plane connection with a network operated by a certain network operator and a user-plane connection with another network operated by a different network operator.

FIG. 7 also illustrates an example scenario in which a network device establishes a control-plane connection with a network operated by a certain network operator and a user-plane connection with another network operated by a different network operator. In this case, the UE CPF 164 establishes 702 a control-plane connection with the MME 132, and the proxy allocation server 130 facilitates 704 synchronization of the registration context between the MME 132 and the AMF 134. The proxy allocation server 130 then continues 706 to coordinate control-plane traffic between the MME 132 and the AMF 134, so that the UE CPF 162 can establish 730 a user-plane connection with the SGW-U 138. The UE 102 then can continue to exchange control-plane messages with the MME 132 controlled by the first network provider 115, and user-plane messages with the SGW-U 138 controlled by the second network provider 117.

For further clarity, the discussion now turns to several example methods that can be implemented in the environment 100 of FIG. 1A and/or the environment 180 of FIG. 1B. These methods can be implemented as respective sets of software instructions and executed on the processing hardware of the corresponding device. Although the discussion below pertains primarily to the UE 102 and the proxy allocation server 130, these methods in general can be implemented in any suitable terminal device or network device.

Figure 8:
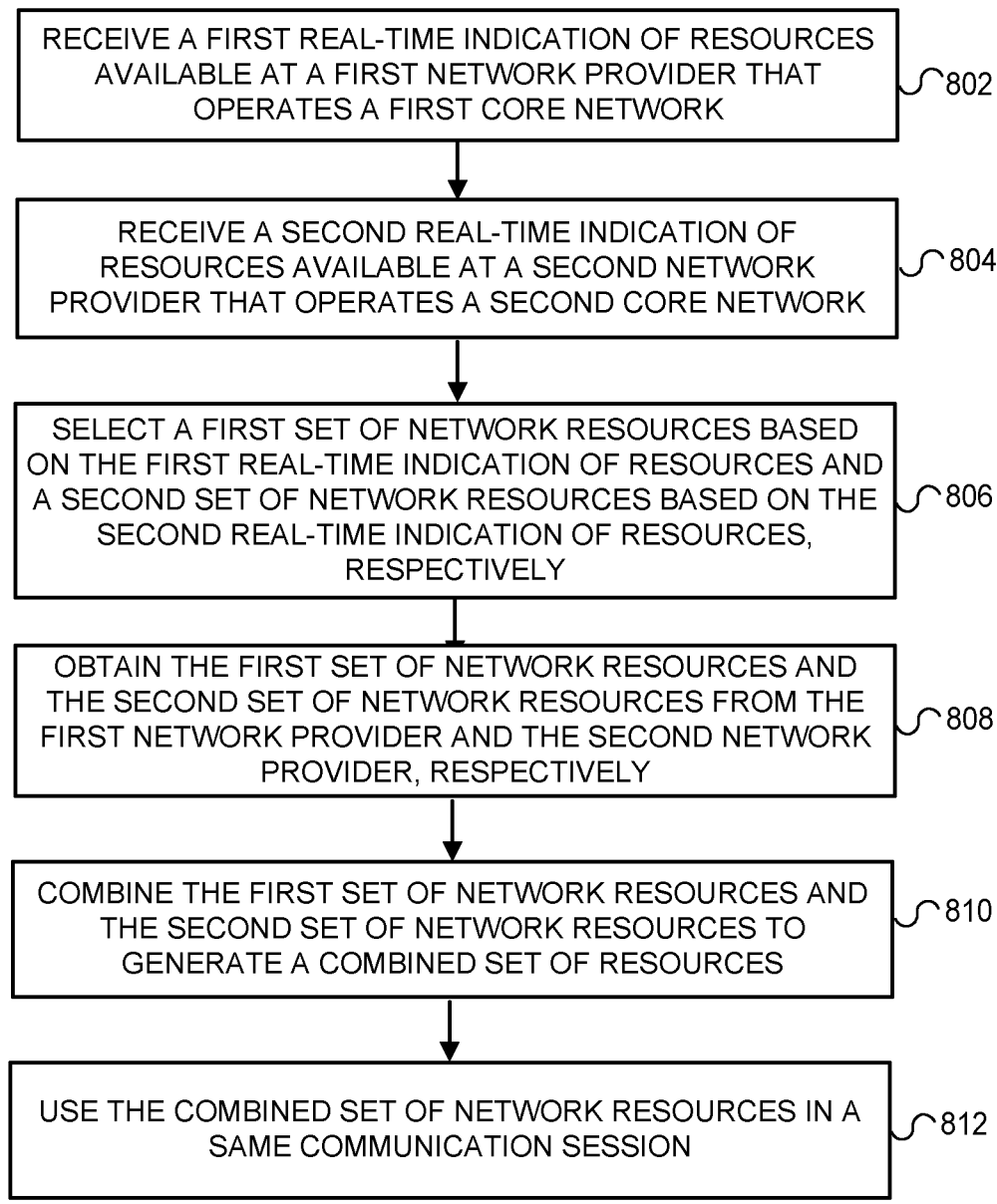
FIG. 8 is a flow diagram of an example method for combining resources from at least two networks operated by different respective network providers, which can be implemented in the user device of FIGS. 1A-B.

Referring first to FIG. 8, a method 800 for combining resources from at least two networks operated by different respective network providers can be implemented in the UE 102 or another suitable user device. The method 800 begins at block 802, where the UE 102 receives a first real-time indication of resources available at a first network provider that operates a first core network and utilizes a first radio carrier. The first real-time indication of resources can include any combination of the following metrics or parameters associated with the first network provider: energy-per-bit, available network capacity, spectrum efficiency, and congestion information. The UE 102 can receive the first real-time indication from a first base station communicatively coupled to the first core network. The first real-time indication can be included in a first broadcast message advertising resources of the first base station and/or the first core network or, in another implementation, a message the base station transmits specifically to the UE 102. For example, the UE 102 can receive the quality metric from the eNB 104 as the message 410 (see FIG. 4).

Next, at block 804, the UE 102 receives a second real-time indication of resources available at a second network provider that operates a second core network and utilizes a second radio carrier. The user device can receive the second real-time indication from a second base station communicatively coupled to the second core network, where the second real-time indication can be included in a second broadcast advertising resources of the second base station and/or the second core network. Again referring back to FIG. 4, the UE 102 for example can receive the quality metric from the gNB 106 as the message 412.

At block 806, the UE 102 selects a first and a second sets of network resources based on the received real-time indication of resources. For example, the UE 102 in FIG. 4 makes the selection at stage 420. The UE 102 then obtains these network resources at block 808 from the first network provider and the second network provider (e.g., the UE 102 in FIG. 4 establishes user-plane connections with the respective networks at stages 432 and 438; also see the network slices 222 and 224 in FIG. 2). The UE 102 combines these resources to generate a combined set of resources at block 810, and uses this combined of network resources in a same communication session (e.g., stage 450 of FIG. 4).

Figure 9:
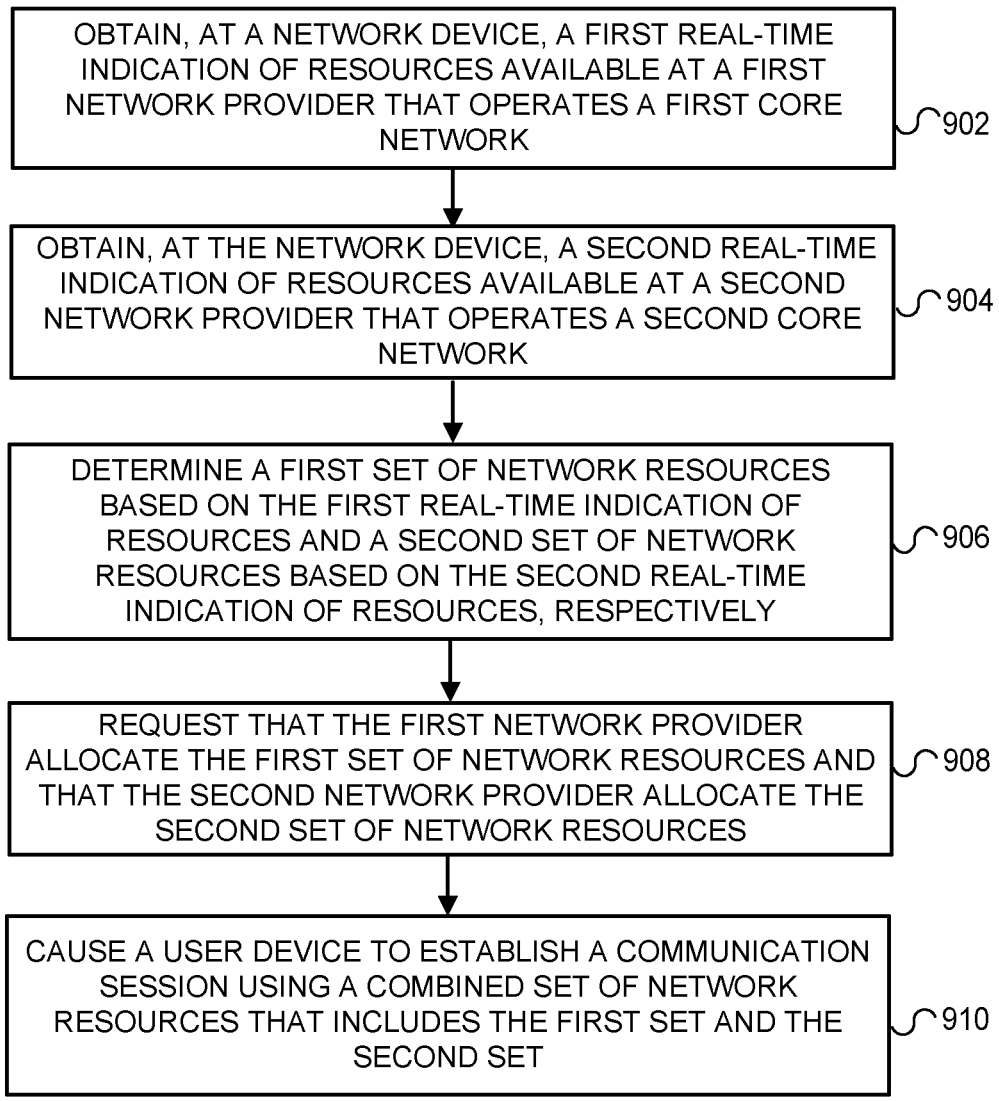
FIG. 9 is a flow diagram of an example method for combining resources from at least two networks operated by different respective network providers, which can be implemented in the allocation proxy server of FIGS. 1A-B.

FIG. 9 is a flow diagram of an example method 900 for combining resources from at least two networks operated by different respective network providers, which can be implemented in the allocation proxy server 130, for example. The method 900 begins at block 902, where the proxy allocation server 130 obtains a first real-time indication of resources available at a first network provider that operates a first core network and utilizes a first radio carrier, similar to the method 800 above. The proxy allocation server 130 can receive the first real-time indication from a first base station communicatively coupled to the first core network. For example, the proxy allocation server 130 can receive the quality metric from the eNB 104 as the message 510 (see FIG. 5).

Next, at block 904, the proxy allocation server 130 obtains a second real-time indication of resources available at a second network provider that operates a second core network and utilizes a second radio carrier. The proxy allocation server 130 can receive the second real-time indication from a second base station communicatively coupled to the second core network, where the second real-time indication can be included in a second broadcast advertising resources of the second base station and/or the second core network. Referring back to FIG. 5, the proxy allocation server 130 for example can receive the quality metric from the gNB 106 as the message 512.

At block 906, the proxy allocation server 130 selects a first and a second sets of network resources based on the received real-time indication of resources. For example, the proxy allocation server 130 in FIG. 5 makes the selection at stage 520. The proxy allocation server 130 then requests that the first network provider and the second network provider allocate these resources, at block 908 (see for example messages 530 and 536 in FIG. 5; also see the network slices 222 and 224 in FIG. 2). At block 910, the proxy allocation server 130 causes the UE 102 to establish a communication session using a combined set of network resources. For example, as illustrated in FIG. 5, the proxy allocation server 130 transmits the messages 530, 536 to cause the UE UPF 164 to set up respective network slices at stages 532, 538, and use the combined resources in a same communication session at stage 550.

Figure 10:
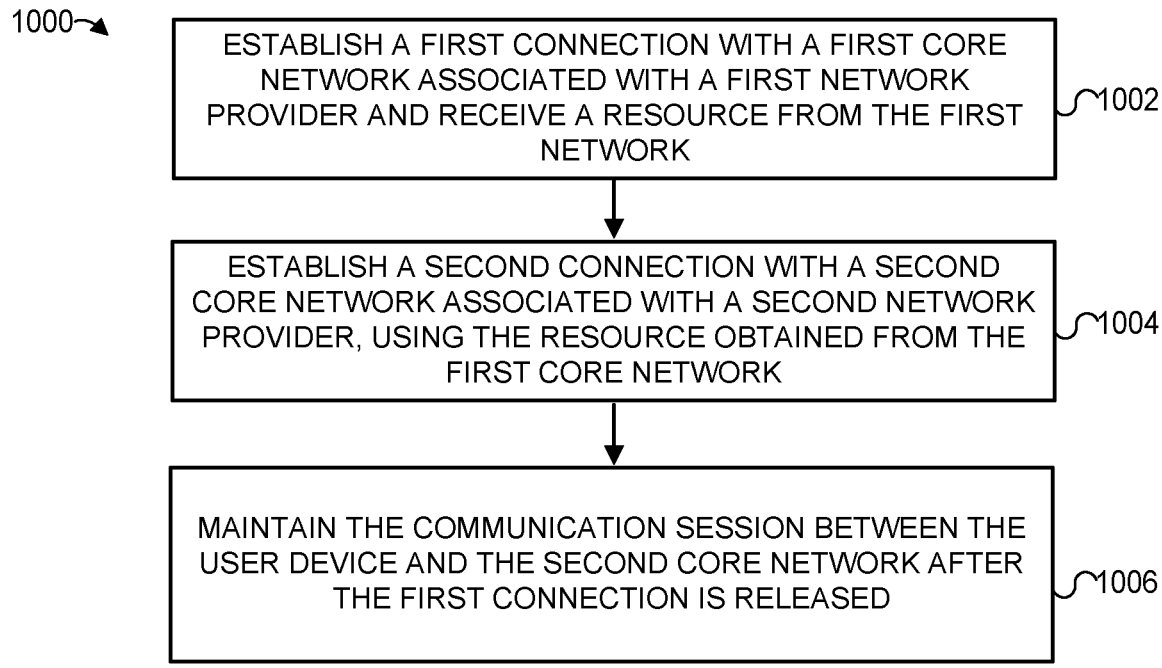
FIG. 10 is a flow diagram of an example method for maintaining a communication session between a user device and a communication end point after switching between networks operated by different network providers, which can be implemented in the environment of FIGS. 1A-B.

Next, FIG. 10 illustrates an example method 1000 for maintaining a communication session between a user device and a communication end point after switching between networks operated by different network providers, which can be implemented in the environment of FIGS. 1A-B. The method 1000 begins at block 1002, where the UE 102 establishes a first connection with a first core network associated with a first network provider, and receives a resource from the first network. For example, referring back to FIG. 2, the UE 102 can obtain the network slice 202 from the first network provider. As another example, the UE UPF 164 can establish a control-plane connection with the MME 132 at stage 602 and a user-plane connection with the SGW 136 at stage 630, as illustrated in FIG. 6.

At block 1004, the UE 102 establishes a second connection with a second core network associated with a second network provider, and receives a resource from the second network, and receives a resource from the first network. For example, referring back to FIG. 2, the UE 102 can obtain the network slice 222 from the second network provider. As another example, the UE UPF 164 can establish a control-plane connection with the AMF 134 at stage 606 and a user-plane connection with the SGW-U 138 at stage 664, as illustrated in FIG. 6.

Next, at block 1006, the UE 102 maintains the communication session between the user device and the second network after the first connection is released. For example, as illustrated in FIG. 6, the UE 102 can maintain the user-plane connection to the second network at stage 680.

Figure 11:
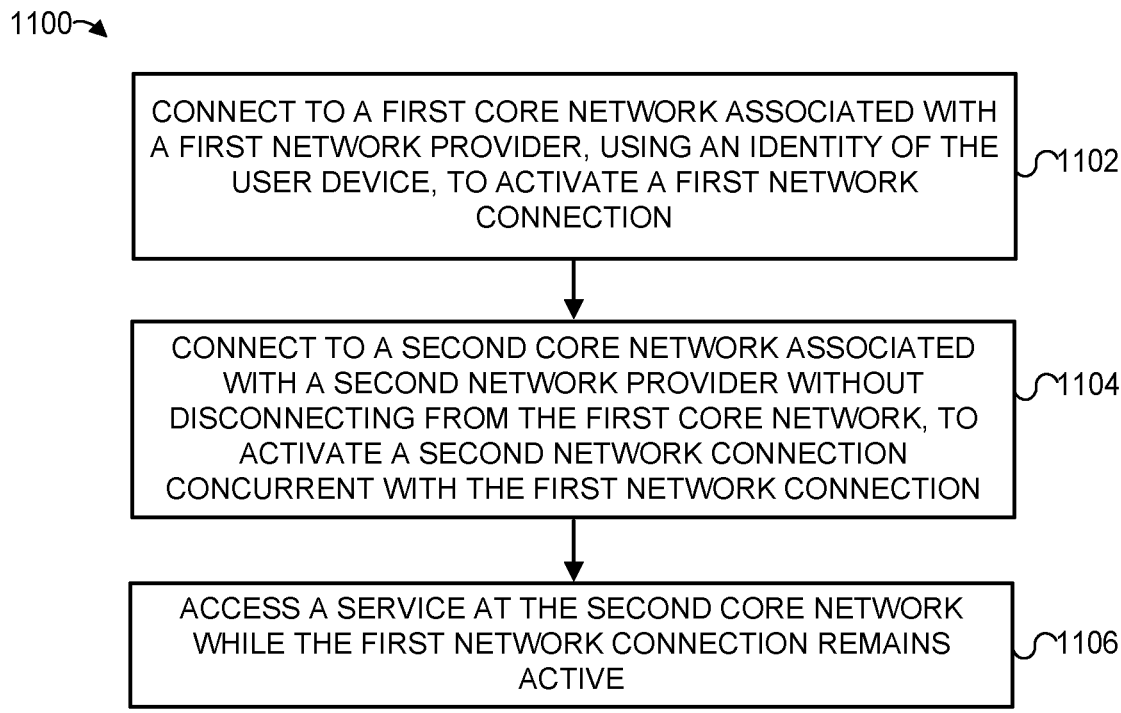
FIG. 11 is a flow diagram of an example method for connecting to two core networks operated by different respective network operators using the same identity, which can be implemented in a user device in the environment of FIGS. 1A-B.

FIG. 11 illustrates an example method 1100 for connecting to two core networks operated by different respective network operators using the same identity, which can be implemented in the UE 102. At block 1102, the UE 102 connects to a first core network associated with a first network provider, using an identity of the user device, to activate a first network connection. The UE 102 then connects to a second core network associated with a second network provider, using the same identity of the user device, to activate a second network connection concurrent with the first connection, at block 1104. For example, at illustrated in FIGS. 3 and 7, the UE 102 registers with the network providers 115 and 117 using the same registration context.

At block 1106, the UE 102 accesses a service at the second core network while the first connection remains active. For example, as illustrated in FIG. 7, the UE 102 can maintain the control-plane connection established at block 702 while accessing a service of the network provider 117 via the user plane established at stage 730.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for reducing latency in uplink communication through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method for utilizing network resources includes allocating, by processing hardware, (i) a first set of network resources associated with a first network provider that operates a first core network and utilizes a first radio carrier and (ii) a second set of network resources associated with a second network provider that operates a second core network and utilizes a second radio carrier; combining, by the processing hardware, the first set of network resources and the second set of network resources to generate a combined set of network resources; and using the combined set of network resources to transmit data between a user device and the first core network and between the user device and the second core network, concurrently in a same communication session.

Aspect 2. The method of aspect 1, where the allocating includes receiving, at the user device, (i) a first real-time indication of resources available at the first network provider, and (ii) a second real-time indication of resources available at the second network provider. The allocating further includes selecting, by the user device, (i) the first set of network resources based on the first real-time indication, (ii) the second set of network resources based on the second real-time indication; and requesting, by the user device, the first set of network resources from the first network provider and the second set of network resources from the second network provider.

Aspect 3. The method of aspect 2, where receiving the first real-time indication and the second real-time indication includes: receiving the first real-time indication from a first base station communicatively coupled to the first core network, and receiving the second real-time indication from a second base station communicatively coupled to the second core network.

Aspect 4. The method of aspect 3, where the first real-time indication is included in a first broadcast advertising resources of the first base station and/or the first core network, and the second real-time indication is included in a second broadcast advertising resources of the second base station and/or the second core network.

Aspect 5. The method of aspect 1, further comprising: obtaining, at a network device, (i) a first real-time indication of resources available at the first network provider, and (ii) a second real-time indication of resources available at the second network provider; determining, by the network device, (i) the first set of network resources based on the first real-time indication, and (ii) the second set of network resources based on the second real-time indication; transmitting, by the network device, an indication of the first set of network resources and the second set of network resources to each of the first core network, the second core network, and the user device.

Aspect 6. The method of any of the aspects 2-5, wherein each of the first real-time indication and the second real-time indication includes an energy-per-bit metric for the respective network provider.

Aspect 7. The method of any of the aspects 2-5, wherein each of the first real-time indication and the second real-time indication includes an available network capacity metric for the respective network provider.

Aspect 8. The method of any of the aspects 2-5, wherein each of the first real-time indication and the second real-time indication includes a spectrum efficiency metric for the respective network provider.

Aspect 9. The method of any of the aspects 2-5, wherein each of the first real-time indication and the second real-time indication includes a congestion metric for the respective network provider.

Aspect 10. The method of any of the preceding aspects, wherein the allocating further comprises: assigning (i) radio resources of a first radio access technology (RAT), between the user device and a first base station of the first network provider, and (ii) radio resources of a second RAT, between the user device and a second base station of the second network provider.

Aspect 11. The method of any of aspects 1-9, wherein the allocating comprises: assigning (i) radio resources of a certain RAT between the user device and a first base station of the first network provider, and assigning (ii) radio resources of the certain RAT between the user device and a second base station of the second network provider.

Aspect 12. The method of any of the preceding aspects, wherein using the combined set of network resources to transmit the data comprises: using the combined set of network resources to transmit (i) user plane traffic between the user device and the first core network, and (ii) control plane traffic between the user device and the second core network.

Aspect 13. The method of any of aspects 1-11, wherein using the combined set of network resources to transmit the data comprises: using the combined set of network resources to transmit (i) user plane traffic and control plane traffic between the user device and the first core network, and (ii) the user plane traffic between the user device and the second core network.

Aspect 14. The method of any of the preceding aspects, wherein the communication session is one of a packet-based voice call or a packet-based video call, and wherein using the combined set of network resources includes transmitting a first portion of packets via the first core network and transmitting a second portion of packets via the second core network.

Aspect 15. A non-transitory medium storing thereon instructions that, when executed by processing hardware of a user device, cause the user device to perform a method according to any of the preceding aspects.

Aspect 16. A method in a network server for concurrently utilizing resources of multiple network providers, the method comprising: receiving, by processing hardware, an indication that a user device is connected via at least one base station using a same identity, to (i) a first core network associated with a first service provider, over a first radio carrier, and (ii) a second core network associated with a second service provider, over a second radio carrier; and establishing, by the processing hardware, a communication session, including: allocating a first set of network resources of the first service provider, and allocating a second set of network resources of the second service provider, to cause the user device to use the first set of network resources and the second set of network resources concurrently for receiving downlink data and/or transmitting uplink data during the communication session.

Aspect 17. The method of aspect 16, wherein the allocating comprises: receiving, at the network server, (i) a first real-time indication of resources available at the first network provider, and (ii) a second real-time indication of resources available at the second network provider; selecting, by the network server, (i) the first set of network resources based on the first real-time indication, and (ii) the second set of network resources based on the second real-time indication; and requesting, by network server, the first set of network resources from the first network provider and the second set of network resources from the second network provider.

Aspect 18. The method of aspect 16 or 17, further comprising: causing the user device to use the combined set of network resources to transmit (i) user plane traffic between the user device and the first core network, and (ii) control plane traffic between the user device and the second core network.

Aspect 19. The method of aspect 16 or 17, further comprising: causing the user device to use the combined set of network resources to transmit (i) user plane traffic and control plane traffic between the user device and the first core network, and (ii) the user plane traffic between the user device and the second core network.

Aspect 20. A method in a user device for using resources of multiple network providers comprises: establishing, by processing hardware, a first connection with a first core network associated with a first network provider to support a communication session, including receiving a resource from the first core network; establishing, by the processing hardware, a second connection with a second core network associated with a second network provider, using the resource, to support the communication session; and maintaining, by the processing hardware, the communication session between the user device and the second core network after the first connection is released.

Aspect 21. The method of aspect 20, wherein the receiving the resource from the first core network includes receiving a temporary identity.

Aspect 22. The method of aspect 20, wherein the establishing the first connection includes establishing the first connection via a first cell that operates according to a first radio access technology (RAT), and the establishing the second connection includes establishing the second connection via a second cell that operates according to a second RAT.

Aspect 23. The method of aspect 20, wherein establishing the first connection includes establishing a control plane connection and a user plane connection.

Aspect 24. The method of aspect 23, wherein maintaining the communication session between the user device and the second core network includes maintaining the user plane connection.

Aspect 25. A method in a user device for accessing resources of multiple network providers comprises: connecting, by processing hardware using an identity of the user device, to a first core network associated with a first network provider, to activate a first network connection; connecting, by the processing hardware using the same identity, to a second core network associated with a second network provider without disconnecting from the first core network, to activate a second network connection concurrent with the first network connection; and accessing, by the processing hardware, a service at the second core network while the first network connection remains active.

Aspect 26. The method of aspect 25, wherein connecting to the first core network and the second core network includes establishing a respective control plane connection.

Aspect 27. The method of aspect 25, wherein connecting to the first core network and the second core network includes establishing a user plane connection with the second core network but not the first core network.

What is claimed is:

1. A method for utilizing network resources by a user device, the method comprising:
    exchanging messages with a first base station to generate quality metrics or request information;
    receiving, from a proxy allocation server, a first real-time indication of resources available at a first network provider;
    receiving, from the proxy allocation server, a second real-time indication of resources available at a second network provider;
    selecting, based on the first real-time indication, a first set of network resources associated with the first network provider that operates a first core network and utilizes a first radio carrier;
    selecting, based on the second real-time indication, a second set of network resources associated with the second network provider that operates a second core network and utilizes a second radio carrier, wherein the first network provider is different from the second network provider;
    combining, by the user device, the first set of network resources and the second set of network resources to generate a combined set of network resources; and
    using the combined set of network resources to transmit data between the user device and the first core network and between the user device and the second core network, concurrently in a same communication session.

2. The method of claim 1, wherein receiving the first real-time indication and the second real-time indication includes:
    receiving the first real-time indication via the first base station communicatively coupled to the first core network; and
    receiving the second real-time indication via a second base station communicatively coupled to the second core network.

3. The method of claim 2, wherein:
    the first real-time indication is included in a first broadcast advertising resources of at least one of the first base station or the first core network; and
    the second real-time indication is included in a second broadcast advertising resources of at least one of the second base station or the second core network.

4. The method of claim 1, wherein each of the first real-time indication and the second real-time indication includes at least one of:
    an energy-per-bit metric for the respective network provider,
    an available network capacity metric for the respective network provider,
    a spectrum efficiency metric for the respective network provider; or
    a congestion metric for the respective network provider.

5. The method of claim 1, wherein using the combined set of network resources to transmit the data comprises:
    using the combined set of network resources to transmit user plane traffic between the user device and the first core network and control plane traffic between the user device and the second core network.

6. The method of claim 1, wherein using the combined set of network resources to transmit the data comprises:
    using the combined set of network resources to transmit user plane traffic and control plane traffic between the user device and the first core network and the user plane traffic between the user device and the second core network.

7. The method of claim 1, further comprising:
    receiving, at the user device, a temporary identity; and
    establishing a connection with the second core network using the temporary identity, to support the same communication session.

8. The method of claim 7, wherein receiving the temporary identity comprises:
    receiving the temporary identity from the first core network.

9. A method performed by a network server for utilizing network resources, the method comprising:
    exchanging messages with at least one base station to generate quality metrics or request information;

receiving an indication that a user device is connected via the at least one base station using a same identity, to a first core network associated with a first network provider, over a first radio carrier, and a second core network associated with a second network provider, over a second radio carrier, wherein the first network provider is different from the second network provider;

receiving a first real-time indication of resources available at the first network provider;

receiving a second real-time indication of resources available at the second network provider; and establishing, by the network server a same communication session, including:

allocating, based on the first real-time indication, a first set of network resources of the first network provider; and allocating, based on the second real-time indication a second set of network resources of the second network provider, to cause the user device to combine the first set of network resources and the second set of network resources to generate a combined set of network resources and to use the combined set of network resources concurrently for at least one of receiving downlink data or transmitting uplink data during the same communication session.

10. The method of claim 9, further comprising:

causing the user device to use the combined set of network resources to transmit user plane traffic between the user device and the first core network and control plane traffic between the user device and the second core network.

11. The method of claim 9, further comprising:

causing the user device to use the combined set of network resources to transmit user plane traffic and control plane traffic between the user device and the first core network and the user plane traffic between the user device and the second core network.

12. A non-transitory computer-readable medium storing thereon instructions that, when executed by a user device, cause the user device to:

exchange messages with a first base station to generate quality metrics or request information; receive, from a proxy allocation server, a first real-time indication of a first set of network resources associated with a first network provider that operates a first core network and utilizes a first radio carrier;

receive, from the proxy allocation server, a second real-time indication of a second set of network resources associated with a second network provider that operates a second core network and utilizes a second radio carrier, wherein the first network provider is different from the second network provider;

combine the first set of network resources and the second set of network resources to generate a combined set of network resources; and use the combined set of network resources to transmit data between the user device and the first core network and between the user device and the second core network, concurrently in a same communication session.

13. The non-transitory computer-readable medium of claim 12, wherein to receive the first real-time indication and the second real-time indication, the instructions cause the user device to:

receive the first real-time indication via the first base station communicatively coupled to the first core network; and receive the second real-time indication via a second base station communicatively coupled to the second core network.

14. The non-transitory computer-readable medium of claim 12, wherein the instructions further cause the user device to:

use the combined set of network resources to transmit user plane traffic between the user device and the first core network and control plane traffic between the user device and the second core network.

15. The non-transitory computer-readable medium of claim 12, wherein the instructions further cause the user device to:

use the combined set of network resources to transmit user plane traffic and control plane traffic between the user device and the first core network and the user plane traffic between the user device and the second core network.

16. The non-transitory computer-readable medium of claim 12, wherein the instructions further cause the user device to:

receive a temporary identity; and establish a connection with the second core network using the temporary identity, to support the same communication session.

* * * * *